(12) United States Patent
Sachidanandam et al.

(10) Patent No.: US 10,356,031 B2
(45) Date of Patent: Jul. 16, 2019

(54) PRIORITIZED COMMUNICATION INBOX

(71) Applicant: MICROSOFT TECHNOLOGY LICENSING, LLC, Redmond, WA (US)

(72) Inventors: Vignesh Sachidanandam, Seattle, WA (US); Ned Bearer Friend, Seattle, WA (US); Hiroshi Tsukahara, Bellevue, WA (US); Peter Loren Engrav, Seattle, WA (US); Scott Stiles, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 15/071,153

(22) Filed: Mar. 15, 2016

(65) Prior Publication Data

US 2017/0093783 A1 Mar. 30, 2017

Related U.S. Application Data

(60) Provisional application No. 62/235,275, filed on Sep. 30, 2015.

(51) Int. Cl.
*G06F 15/16* (2006.01)
*H04L 12/58* (2006.01)
*G06Q 10/10* (2012.01)

(52) U.S. Cl.
CPC .......... *H04L 51/26* (2013.01); *G06Q 10/107* (2013.01); *H04L 51/10* (2013.01); *H04L 51/22* (2013.01)

(58) Field of Classification Search
CPC ......... H04L 51/10; H04L 51/22; H04L 51/26; G06Q 10/107
See application file for complete search history.

(56) References Cited

U.S. PATENT DOCUMENTS

| 7,164,759 | B2 * | 1/2007 | Lebowitz | .......... H04M 3/42102 379/142.03 |
| 8,233,943 | B1 * | 7/2012 | Othmer | ................... G06F 9/542 379/207.16 |
| 8,631,080 | B2 | 1/2014 | Goodman et al. | |

(Continued)

OTHER PUBLICATIONS

"Gmail: Signatures, labels, and filters", Dec. 9, 2011, Google Apps|Getting Started (pulled from https://www.wju.edu/it/pdf/gmail-getting-started-2.pdf on Apr. 26, 2018), pp. 1-6 (Year: 2011).*

(Continued)

*Primary Examiner* — Jonathan A Bui
(74) *Attorney, Agent, or Firm* — Michael Best & Friedrich LLP

(57) ABSTRACT

Prioritized and categorized presentation of incoming communications is provided based on characteristics of the communications such as sender, recipients, subject, body content, recipient's past interactions, and similar ones. User or administrator defined explicit rules and configurations may be taken into consideration along with analysis results of incoming communication attributes and user history in determining a category and a priority level for the incoming communication. The incoming communication may then be presented according to the determined category and priority level along with tools for the recipient to modify automatic determinations and otherwise interact with the communication.

17 Claims, 11 Drawing Sheets

(56) References Cited

U.S. PATENT DOCUMENTS

| | | | |
|---|---|---|---|
| 8,862,519 B2 | 10/2014 | O'Sullivan et al. | |
| 8,935,190 B2 | 1/2015 | Amoroso et al. | |
| 9,043,403 B2 | 5/2015 | Schnitman et al. | |
| 2005/0091674 A1* | 4/2005 | Knight | G06F 9/4488 719/332 |
| 2007/0165623 A1* | 7/2007 | Clark | H04L 67/24 370/389 |
| 2009/0049144 A1* | 2/2009 | Suzuki | G06Q 10/107 709/206 |
| 2009/0125602 A1 | 5/2009 | Bhatia et al. | |
| 2009/0282127 A1* | 11/2009 | Leblanc | H04L 12/5695 709/219 |
| 2012/0149405 A1 | 6/2012 | Bhat | |
| 2012/0331398 A1 | 12/2012 | Madnani | |
| 2013/0110992 A1* | 5/2013 | Ravindra | H04W 4/185 709/220 |
| 2014/0129661 A1 | 5/2014 | Thyagaraja | |
| 2014/0280616 A1* | 9/2014 | Ramanathan | H04L 51/22 709/206 |
| 2014/0325007 A1* | 10/2014 | Dulitz | H04L 51/12 709/206 |
| 2015/0032829 A1 | 1/2015 | Barshow et al. | |
| 2015/0061971 A1* | 3/2015 | Choi | G06F 3/1446 345/2.3 |
| 2015/0081804 A1 | 3/2015 | Banatwala et al. | |
| 2015/0089007 A1* | 3/2015 | Amoroso | G06Q 10/107 709/206 |
| 2015/0113079 A1 | 4/2015 | Etgar et al. | |
| 2015/0188870 A1* | 7/2015 | Sharp | H04L 51/22 715/752 |
| 2015/0200899 A1 | 7/2015 | Sanketi | |
| 2015/0339373 A1* | 11/2015 | Carlson | G06F 17/30601 707/737 |
| 2015/0350146 A1* | 12/2015 | Cary | H04W 4/90 709/206 |
| 2016/0019285 A1* | 1/2016 | Whelan | G06F 17/30705 707/740 |
| 2016/0196561 A1* | 7/2016 | Iyer | G06Q 30/016 705/304 |
| 2016/0313910 A1* | 10/2016 | Deepak | G06F 3/04883 |

OTHER PUBLICATIONS

Lori Kaufman, "Inbox Management and Labels", Feb. 26, 2014, Gmail Guide: Inbox Management and Labels (pulled from https://www.howtogeek.com/school/gmail-guide/lesson3/ on Apr. 25, 2018), pp. 1-18 (Year: 2014).*

JR Raphael, "Six weeks with Google's Inbox—and why its back to Gmail for me", Dec. 4, 2014, Computerworld, pp. 1-8 (Year: 2014).*

Shalini Agarwal, "A bit about Bundles in Inbox", Nov. 19, 2014, Official Gmail Blog, pp. 1-4 (Year: 2014).*

Matteson, Scott, "Use Labels in Gmail for Better E-Mail Management", Published on: Jan. 29, 2014, Available at: http://www.techrepublic.com/blog/google-in-the-enterprise/use-labels-in-gmail-for-better-e-mail-management/.

'Email Marketers' Welcome Messages Drive and Predict Subscriber Engagement: Return Path Study, Published on: Feb. 24, 2015, Available at: https://returnpath.com/press-releases/email-marketers-welcome-messages-drive-and-predict-subscriber-engagement-return-path-study/.

"International Search Report and Written Opinion Issued in PCT Application No. PCT/US2016/053640", dated Dec. 14, 2016, 10 Pages. (MS# 358572-WO-PCT).

"Second Written Opinion Issued in PCT Application No. PCT/US2016/053640", dated Aug. 17, 2017, 6 Pages. (MS# 358572-WO-PCT).

"International Preliminary Report on Patentability Issued in PCT Application No. PCT/US2016/053640", dated Nov. 15, 2017, 7 Pages. (MS# 358572-WO-PCT).

* cited by examiner

PRIORITIZED COMMUNICATION INBOX

CROSS-REFERENCE TO RELATED APPLICATION

This application claims priority under 35 U.S.C. § 119(e) to U.S. Provisional Patent Application Ser. No. 62/235,275 filed on Sep. 30, 2015. The disclosure of the U.S. Provisional Patent Applications is hereby incorporated by reference in its entirety.

BACKGROUND

Being caught up with large number of incoming communications today forces users to make a choice. They can get distracted frequently by less important communications or spend the day in fear of missing important communications (forcing frequent checking of mail as a result, for example). Upon checking mail for incoming communication, it may often be difficult to quickly process the important information (due to the volume of content and the interspersing of important and less important items).

Some conventional communication applications may support prioritization of incoming communications. However, such features typically act as a filter over an existing inbox experience (that the user may need to apply manually). Further, typical notifications are category based, and not importance based. Thus, importance of an incoming communication may have no impact on the ordering of items in the inbox.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing prioritized and categorized presentation of items on an inbox of a communication application. In some examples, one or more explicit rules and configurations may be received and attributes of an item and history of interactions of a recipient of the item may be analyzed. Next, a category and a priority level may be determined for the item based on the one or more rules and configurations and an inference based on the analysis. The item may then be displayed according to the determined category and priority level through an automatic categorization and ordering of items on the inbox, a selection of a priority group control, or a selection from a list of available groups and categories.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
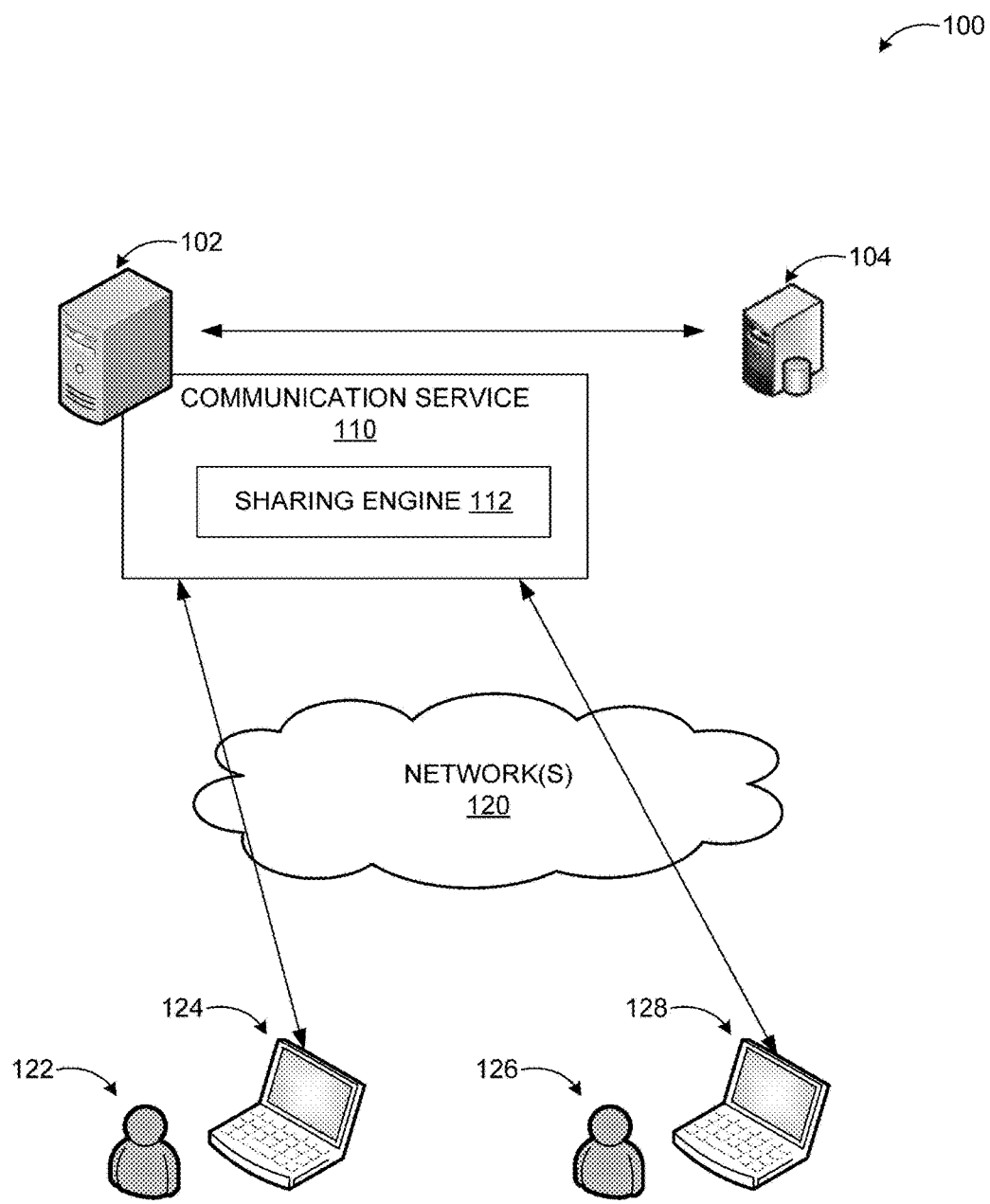
FIG. 1 is a conceptual display diagram illustrating an example computing environment for providing prioritized and categorized presentation of incoming communications, according to embodiments.

As briefly described above, embodiments are directed to prioritized and categorized presentation of incoming communications based on characteristics of the communications such as sender, recipients, subject, body content, recipient's past interactions, and similar ones. User or administrator defined explicit rules and configurations may be taken into consideration along with analysis results of incoming communication attributes and user history in determining a category and a priority level for the incoming communication. The incoming communication may then be presented according to the determined category and priority level along with tools for the recipient to modify automatic determinations and otherwise interact with the communication.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing a communication service with prioritization capabilities. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

The technical advantages of providing prioritized and categorized presentation of incoming communications may include, among others, increased efficiency in communications, reduced processing and network bandwidth usage (reduced number of communications to be reviewed, exchanged), and improved user interaction by allowing users to receive prioritized and categorized incoming communications.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with communications.

FIG. 1 is a conceptual display diagram illustrating an example computing environment for providing prioritized and categorized presentation of incoming communications, according to embodiments.

As shown in a diagram 100, a server 102 may execute a communication service 110 that provides the capability to exchange communication of various modes. The communication service 110 may also include a prioritization engine 112, which may enable prioritized and categorized presentation of incoming communications to users 122, 126, etc. with enhanced functionality. Exchanged communications and associated content may be stored in one or more data stores (for example, local data stores in users' computing devices, cloud storage, and so on), some of which may be managed by a database server 104. The communications and associated data may be managed by multiple servers. Similarly, the communications service 110 may be executed on multiple servers.

The communication service 110 may provide additional functionality such as calendars, scheduling, note taking, task management, contact management, and comparable ones. Various user interfaces may be provided in conjunction with the provided functionality. In some embodiments, the communication service 110 may include distinct applications or modules to provide the different functionalities. In other embodiments, some or all of the modules may be integrated. Furthermore, additional capabilities may be provided through add-ins or integrated third party modules.

Users 122 and 126 may access the communication service 110 through their respective computing devices 124 and 128 over one or more networks 120. The networks 120 may provide wired or wireless communications between nodes, such as the computing devices 124, 128 or the servers 102, 104. In some embodiments, components of the communication service 110 may also be locally executed on a user's computing device. To process the exchanged communications, the communication service 110 may provide a user experience to the users 122 and 126. The user experience may be a visual display through which the users 122 and 126 may interact with the communication service 110. The interactions may include a touch input, a gesture input, a voice command, eye tracking, a gyroscopic input, a pen input, mouse input, and/or a keyboards input, among others. As discussed in further detail below, the user experience may provide visual indications of sharing status of content such as documents, portions of documents, collations of documents, etc.

The computing devices 124 and 128 may each include a display device, such as a touch enabled display component, and a monitor, among others, to provide access to the application 110 for the users 122 and 126 through a web browser (thin client) or a local client application (thick client). The computing devices 122 and 126 may include a desktop computer, a laptop computer, a tablet, a handheld device, a vehicle mount computer, an embedded computer system, a smart phone, and a wearable computer, among other computing devices, for example.

Providing prioritized and categorized presentation of incoming communications may assist users achieve the following goals: staying caught up with important incoming messages through the course of the day; staying focused without distractions when interacting with their mail; losing the fear of missing out on important messages; and quickly catching up on the important items if they have not checked email in a while.

While the example system in FIG. 1 has been described with specific components including the server 102, the database server 104, communication service 110, the prioritization engine 112, embodiments are not limited to these components or system configurations and can be implemented with other system configuration employing fewer or additional components.

Figure 2A:
FIGS. 2A, 2B, and 2C are display diagrams illustrating example user interfaces of a communication application in a mobile environment providing prioritized and categorized presentation of incoming communications, according to embodiments.
Figure 2B:
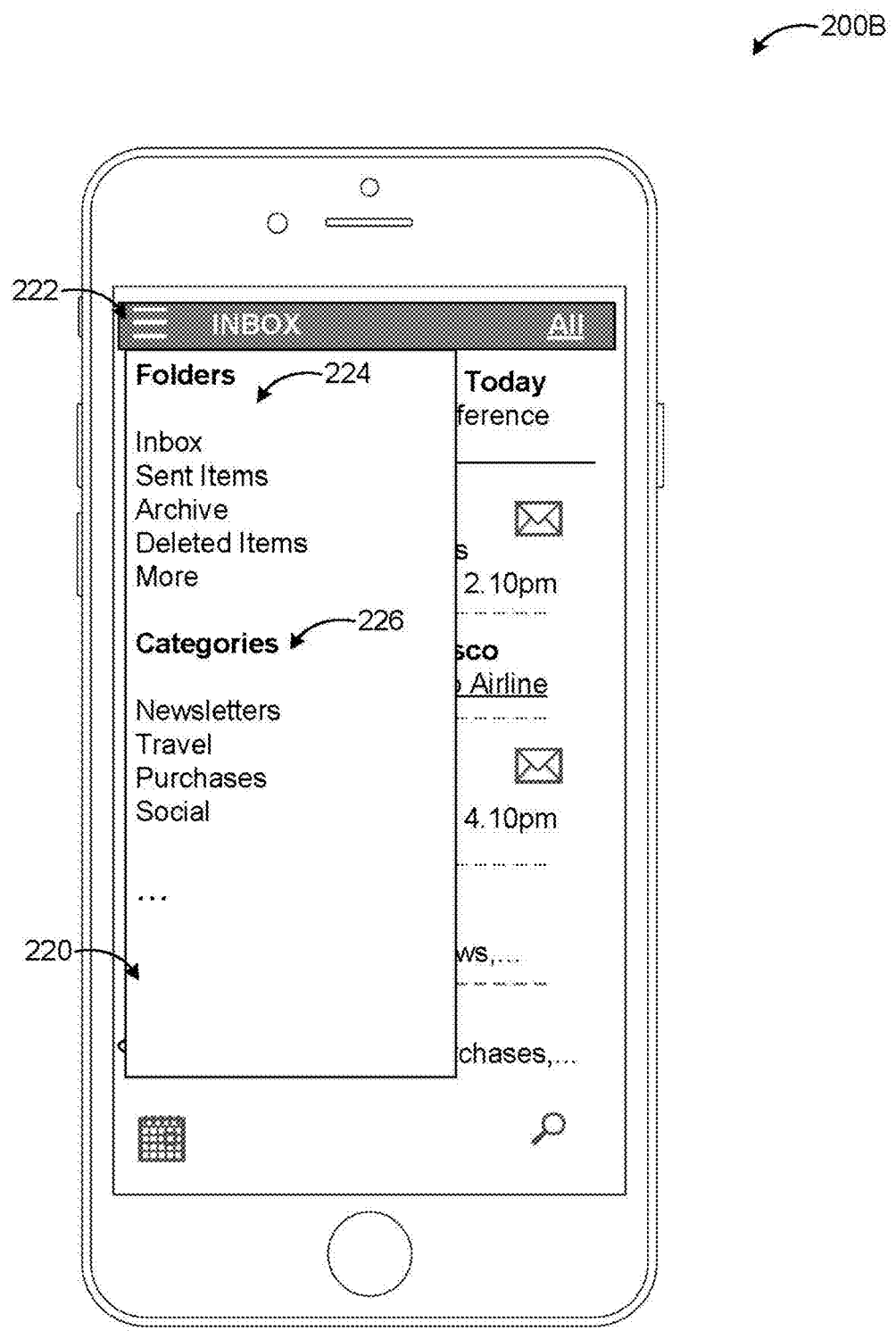
Figure 2C:
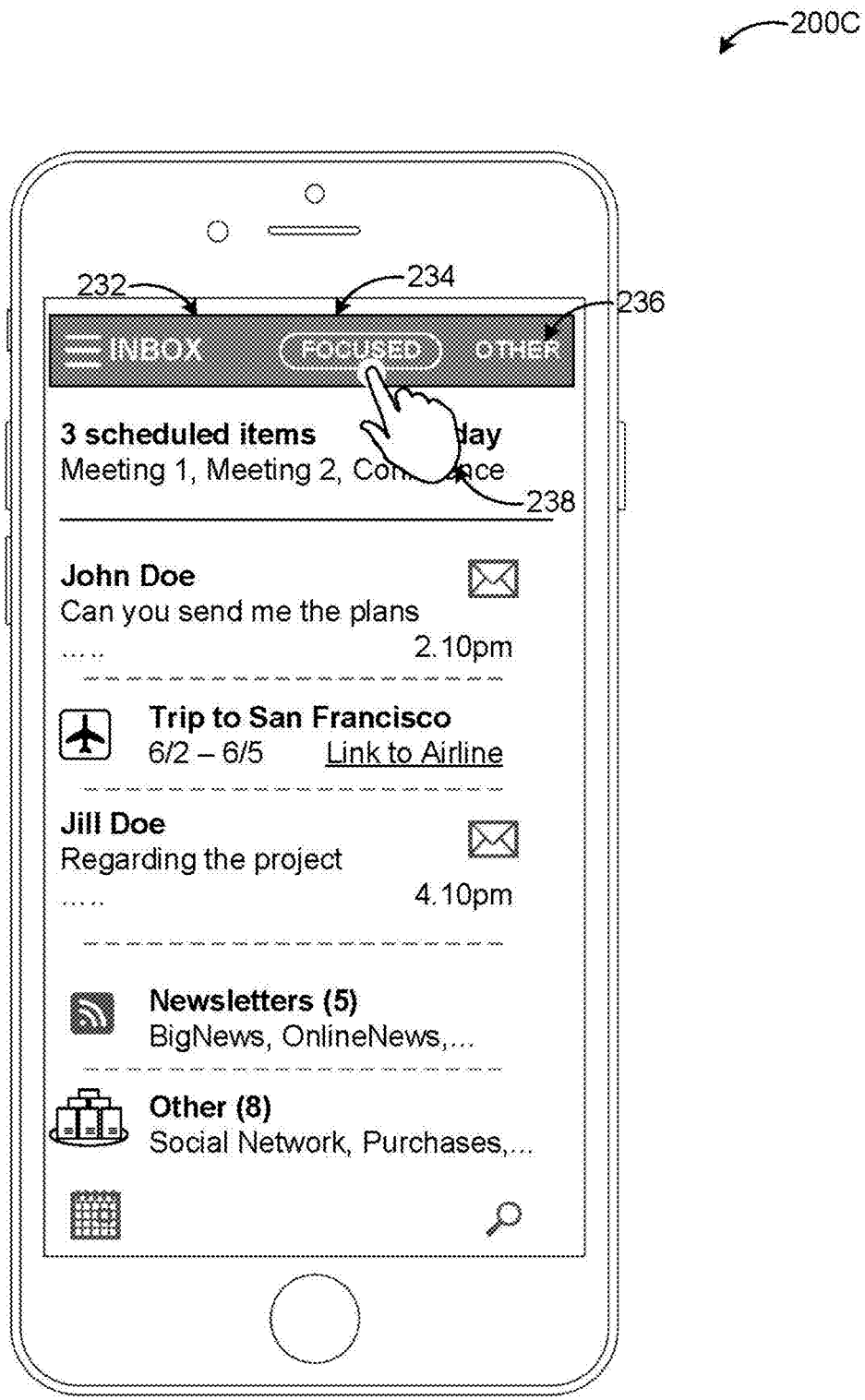

FIGS. 2A, 2B, and 2C are display diagrams illustrating example user interfaces of a communication application in a mobile environment providing prioritized and categorized presentation of incoming communications, according to embodiments.

In some example embodiments, incoming emails that are sent to a user's mailbox may go through the following steps: (1) User set rules/overrides may inform where the item should be delivered in the user's mailbox (to a particular folder, group, or to a particular section of the Inbox folder); (2) Spam/Junk filtering may remove unsafe items from the inbox, and move them to the Junk/Spam folders; (3) Content classification algorithms may tag the item (which may be a message, a calendar item, a contact card, etc.) based on content of the item (for example: newsletter, travel etc.). The auto-tagged items may not be necessarily moved out of the inbox; (4) Inference/machine learned or rule based models may be automatically executed on the items in the inbox to compute the likelihood of a user acting on a given item; (5) Using the computed value through the model, a determination may be made on whether to notify the user about the incoming item/communication (or not). Items that the user is likely to act on may trigger notifications immediately; (6) Using the computed value through the model, the item may be delivered to, for example, a "Focused" or "Other" section of the inbox; (7) Using the computed value through the model, unseen items within "Focused" or "Other" may be re-ordered such that items the user is most likely to act on are presented at the top of the list of unseen items (instead of being sorted by when the item arrived); (8) Using the computed value from content classification and any pre-assigned tag information already available for the item, the items may be displayed in the inbox with the corresponding labels.

Diagram 200A shows a mobile device displaying a user interface of a communication service such as Outlook® by MICROSOFT CORP. of Redmond, Wash. The inbox 202 for a particular user includes a summary information 204 for the day's activities and communication items in a particular order. An email 206 is displayed, for example, at the top of the item list. The email may be the newest arrival and/or one determined to be a high priority level item for the user. The email 206 is followed by a calendar item 208 (representing an upcoming trip) and another email 210. The order of the items may be determined based on explicit rules or inference as discussed above. In some embodiments, enhanced interaction functionality may be provided with the displayed items. For example, the trip reminder may display dates of the trip and provide a link to the airline (or other travel resource) for the user to be able to access travel information, make changes, access resources, etc. directly from the inbox summary display.

Following the three example items are two categories of items displayed, Newsletters 212 and Other 214. The newsletters 212 category may be a group of newsletter communications categorized as such by the prioritization engine of the communication service and grouped together for separate viewing by the user. Some summary information such as number of available items in that group and names of the sources may be displayed as well. The Other 214 group may include items that are deemed to have lower priority based on the model discussed above. The user may view these items separately by selecting the group without having their inbox cluttered with a number of items in which they may not be highly interested.

Diagram 200B of FIG. 2B shows an alternative user interface presentation, where the user may activate a control 222 on the communication application user interface and be presented with a listing of available folders 224 and categories 226 on a view pane 220 overlaid over the inbox. This way, the user may be enabled to select a desired folder or category and view the items in that folder or category.

Diagram 200C of FIG. 2C shows a further alternative presentation, where in addition to the presentation configurations discussed above (or in place of) two main groups of items may be provided to be selected at a list header 232 of the communication application user interface. In some embodiments, the two main groups may include a "Focused" 234 group and the "Other" 236 group. The Other 236 group may be configured similarly to the Other 214 group as discussed in conjunction with FIG. 2A. The Focused 234 group may include items that are deemed to have a high(er) priority for the user based on the model discussed herein. The groups 234 and 236 may be selected (activated) 238 through gesture, touch, or other input and the items in the selected group displayed. The items in the selected group may be displayed according to another level of categorization and/or prioritization within that group similar to the categorization and prioritization as in the top level inbox items. Thus, categorization and prioritization according to embodiments may be in a layered fashion.

In the model discussed above, a likelihood of a user acting on a given item (e.g., email message) may be computed, and mapped to a spectrum, for example: (1) Now/immediately (may trigger notification); (2) Soon (may be displayed in the "Focused" section of inbox); (3) Later (may be displayed in the "Other" section of inbox); (4) Never (may be included in the "Other" section of inbox, or may be moved to a separate folder (example: Personal Junk).

Some of the functionality presented on the example user interfaces of FIG. 2A through 2C may include aspects/tools that may be used to enhance user experience. Some examples of such functionality may include: a watermark or a seen mail line separating items that have been seen in the past versus unseen items in the inbox; Focused/Other sections in the inbox (in the list header); re-ordered unseen items (based on a likelihood of user acting on item, and not based on when item was delivered to inbox); the roll-up item of "Other" in the Focused inbox indicating that there are unseen items in the "Other" section of the inbox. The roll-up item may be ordered last in the list on unseen mail (because "Other" may contain items that the user is less likely to act on).

Figure 3A:
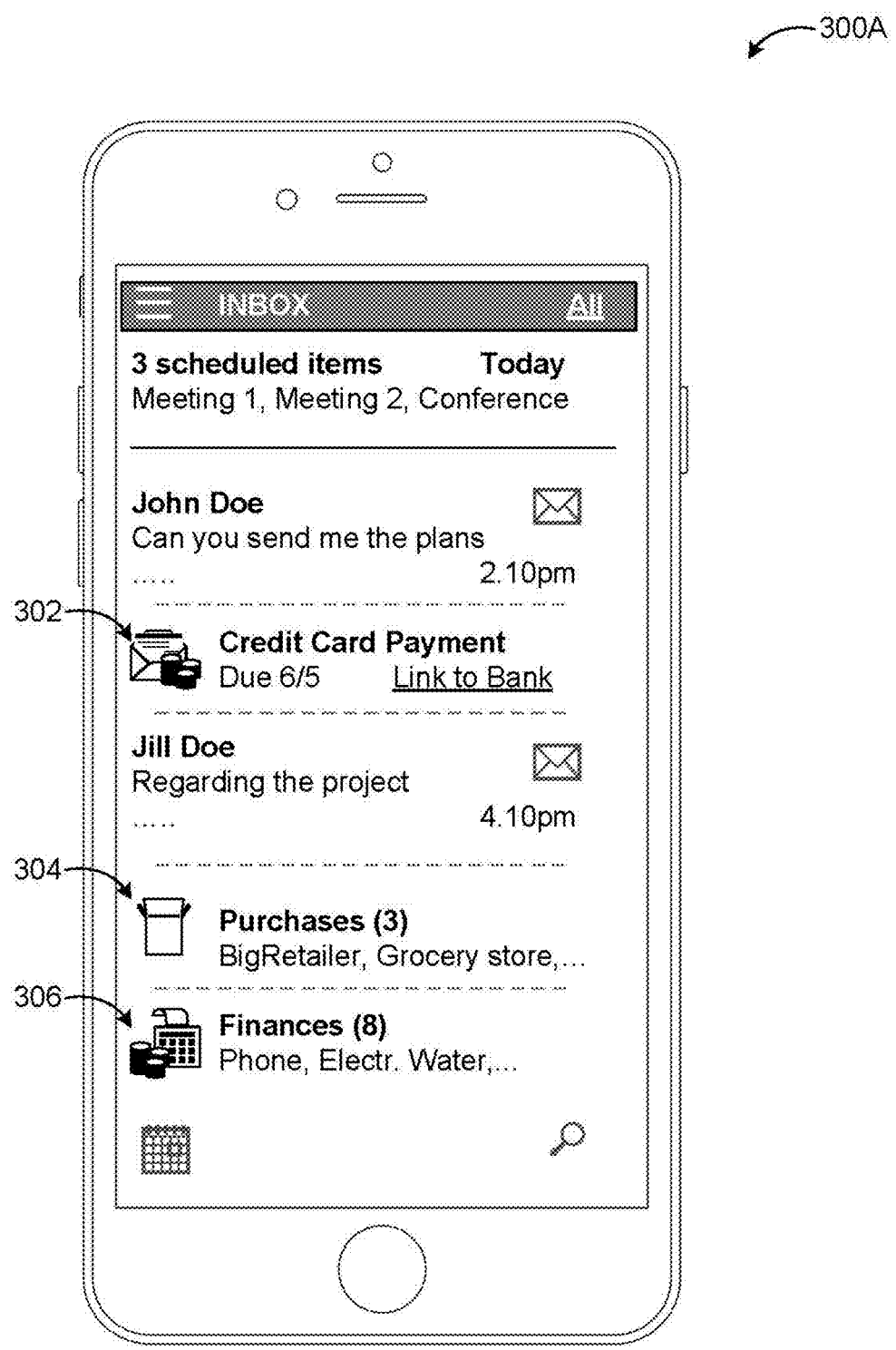
FIGS. 3A and 3B are display diagrams illustrating example presentation of categorized groups of communications and associated enhanced functionality on example user interfaces of a communication application in a mobile environment providing prioritized and categorized presentation of incoming communications, according to embodiments.
Figure 3B:
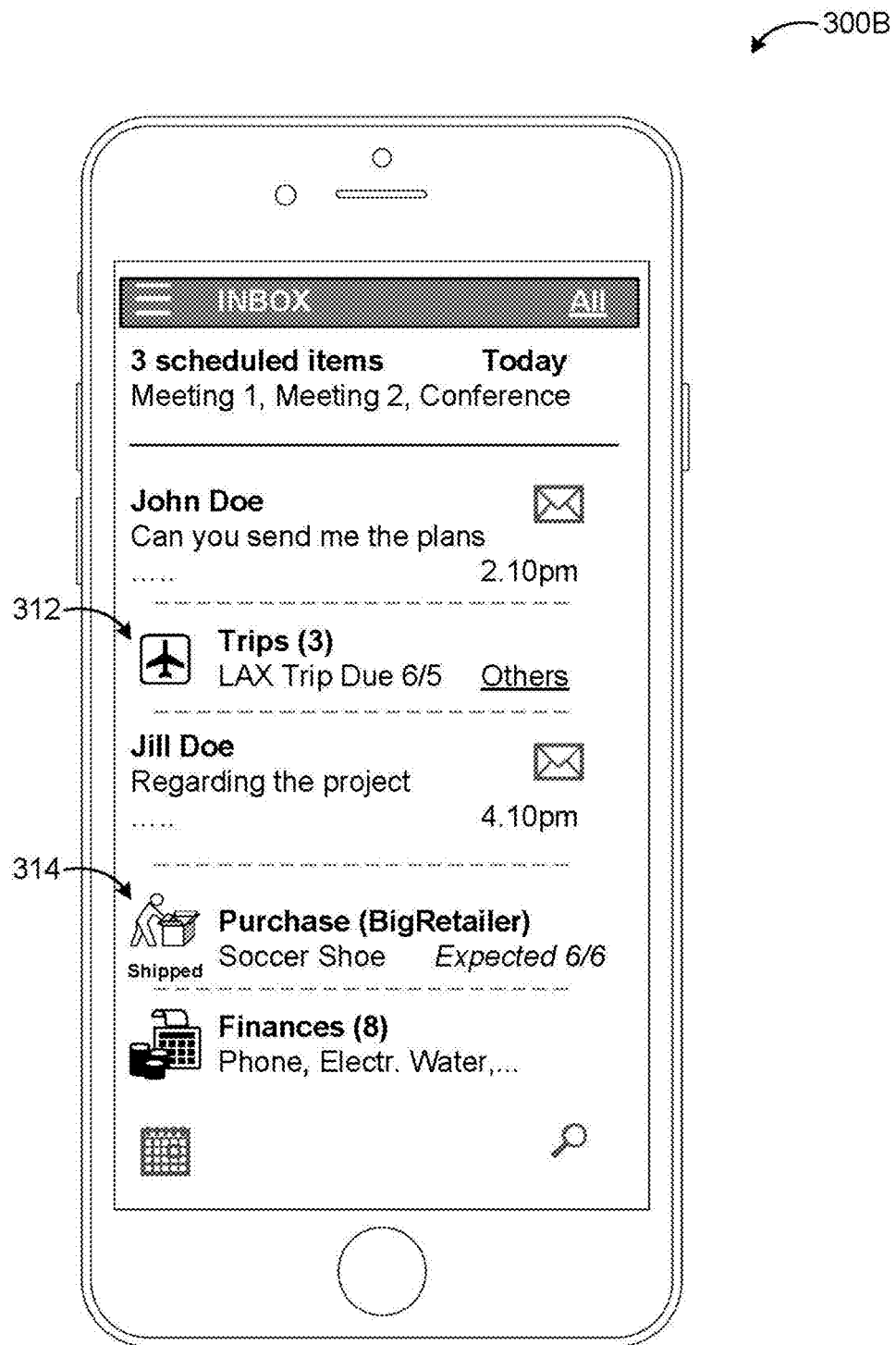

FIGS. 3A and 3B are display diagrams illustrating example presentation of categorized groups of communications and associated enhanced functionality on example user interfaces of a communication application in a mobile environment providing prioritized and categorized presentation of incoming communications, according to embodiments.

According to some embodiments, a height of the displayed items, background color of the displayed items, font styles/weights, font colors, icons associated with the displayed items, and labels may be used to indicate different priorities and/or categories in addition to the order of the displayed items. Furthermore, cards or stacks may also be used to present different categories (folders, groups).

The categories may include, for example, social items newsletters, promotions, purchases, travel items, finance items, events, contacts, family related items, photos, and documents, but are not limited to these examples. Some categories may be displayed as a single roll-up of items in that category such as the "Purchases" 304 category or the "Finances" 306 category in diagram 300A of FIG. 3A showing a summary of items in that category. The individual items may be accessed upon selection of the single roll-up item. The presentation of these categories may be enhanced with various schemes such as the icons displayed on the diagram. Other categories may include a roll-up of different items associated with the same aspect. For example, "Credit Card Payment" 302 may include one or more reminders for the payment, a statement email from the credit card company, etc. The same item also displays functional enhancements such as a link to the bank website. Context-specific summary information displayed along with the item may include a due date of the payment, for example.

Diagram 300B of FIG. 3B includes additional examples of category presentations such as "Trips" 312 category and "Purchase" 314 category. Trips 312 category is an example of single roll-up of multiple items (items related to three trips), where user interaction may be enhanced with context-specific information and functionality. For example, the item as displayed includes the destination and date of the first trip and includes a link to other trips (e.g., to a travel website that manages the trips). Some categories may be presented as single roll-up or roll-up of items for the same aspect. The Purchase 314 category as displayed is related to a purchase of soccer shoes from a retailer. The context-specific information includes a status of the purchase (shipped) and an expected delivery date. Upon selection of the category, other items such as an order confirmation email, other status emails, a receipt, etc. may also be displayed. In some examples, a single-roll-up category may include other categories within. For example, a single roll-up category of Purchases may include multiple category items for individual purchases, each of which may include multiple items related the same purchase.

The context-specific information may be customizable for different types of items. Furthermore, third parties may be allowed to tailor the experience for items related to them. For example, retailers may provide custom information and functionality for items associated with their products or services, which may be displayed in the summary information or within the item itself.

Figure 4:
FIG. 4 is a display diagram illustrating an alternative example user interface of a communication application in a mobile environment providing prioritized and categorized presentation of incoming communications, according to embodiments.

FIG. 4 is a display diagram illustrating an alternative example user interface of a communication application in a mobile environment providing prioritized and categorized presentation of incoming communications, according to embodiments.

Diagram 400 shows some examples of how items within a specific category may be displayed. The example user interface 402 may be displayed upon selection of the "Newsletters" 404 category in a main view. The category may be listed in the list header to inform the user which category they are looking at. Within the selected category, individual items 406 may be displayed according to a priority order. If there are more items (newsletters) available than that can fit on the display, some items may be rolled up to a sub-Other group (Other Newsletters 408) for a secondary level presentation. A chronological divider 410 may also be provided to separate items for different time periods (e.g., days).

Figure 5:
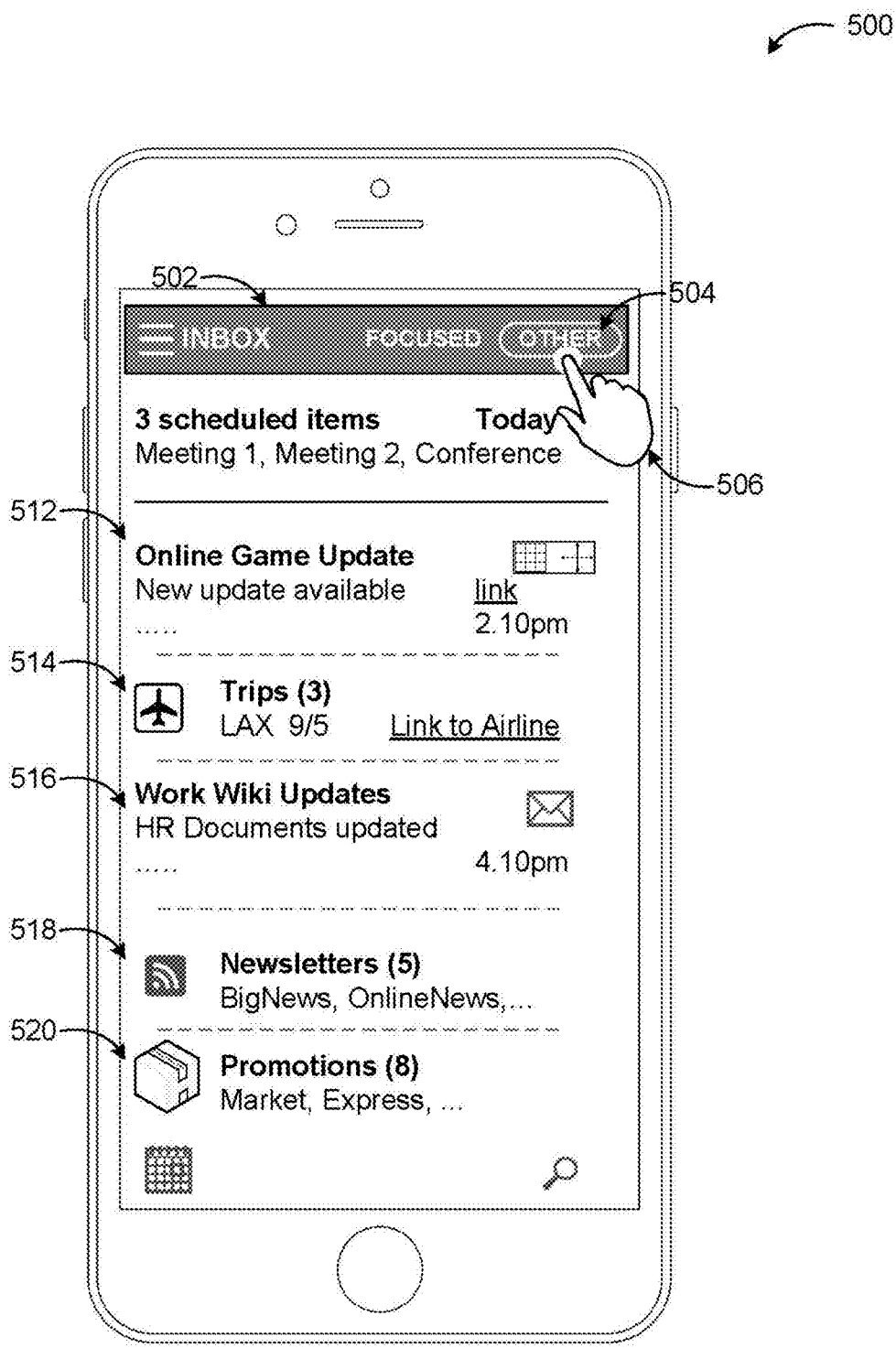
FIG. 5 is a display diagram illustrating an example user interface of a communication application in a mobile environment displaying de-prioritized communications, according to embodiments.

FIG. 5 is a display diagram illustrating an example user interface of a communication application in a mobile environment displaying de-prioritized communications, according to embodiments.

Diagram 500 shows items deemed to have lower priority according to the model discussed herein on a communication application user interface. The Other group containing items with lower priority may be displayed upon selection (506) of an "Other" control 504 in the list header 502. Example items listed in the Other group include an Online Game Update 512, a Trips category 514, Work Documentation Updates category 516, a Newsletters category 518, and a Promotions category 520. Some categories displayed in the lower priority Other group may include items that may be displayed in the higher priority Focused group. For example, upcoming trips may be displayed in a Trips category on the main view or the Focused view. Other trips with later dates may be displayed in the Trips category 514 under the Other group. Similarly, some newsletters may be displayed under the Focused group, while others may be displayed under the Other group. Context-specific information and functionality may also be provided with each (or some) items displayed under the Other group.

According to some embodiments, a user may be enabled to adjust the system manually by setting overrides that inform the system to always move messages from a particular sender/about a particular subject etc. to a section in the inbox for example. In addition to these manual overrides (explicit signals), the system may continue to learn from implicit signals such as user interactions with items in the inbox (and the corresponding attributes of these items).

In other embodiments, smart notifications that notify users for urgent and important communications on the proper device (e.g., smart phone, desktop computer, etc.) may be used. Unseen items may be re-ordered based on relevancy to the user and/or how likely the user is to act on an item. Algorithms that layer rules and inference may be executed to provide users with a personalized set of "Focused" items, and "Other" items. Prioritized inbox user experience may separate the important incoming communications from the rest. Moreover, implicit and explicit user experience affordances may be used to override algorithms, and enhance user interaction.

Figure 6:
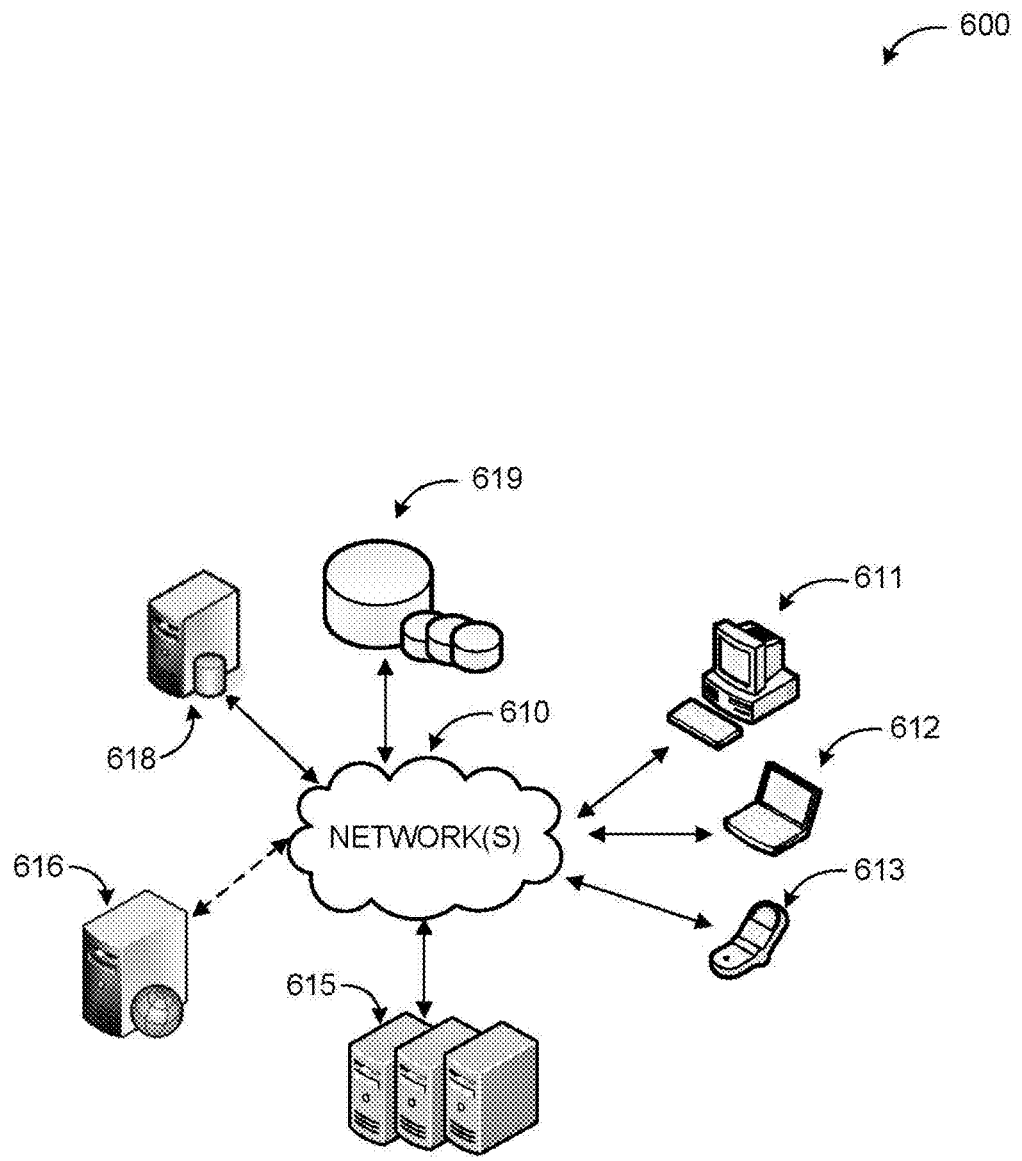
FIG. 6 is a simplified networked environment, where a system according to embodiments may be implemented.

FIG. 6 is a simplified networked environment, where a system according to embodiments may be implemented.

As shown in a diagram 600, an application or a service providing prioritized and categorized presentation of incoming communications may be implemented in a networked environment over one or more networks, such as a network 610. Participants may access the application or service through locally installed or thin (e.g., browser) client applications executed on a variety of computing devices 611-613, such as a smart phone 613, a mobile computer 612, or a desktop computer 611 ('client devices'). The application (or service) may interact with users through locally installed or thin (e.g., browser) client applications executed on a variety of computing devices. Characteristics of incoming communications such as sender, recipients, subject, body content, recipient's past interactions, and similar ones may be analyzed. User or administrator defined explicit rules and configurations may be taken into consideration along with analysis results of incoming communication attributes and user history in determining a category and a priority level for the incoming communication. The incoming communication may then be presented through the client applications according to the determined category and priority level along with tools for the recipient to modify automatic determinations and otherwise interact with the communication.

An application or service, as discussed herein, may be implemented via software executed over servers 615. The servers 615 may include one or more web servers 616, where at least one of the one or more web servers 616 may be configured to provide access to the application or service through web communications. In other examples, the application or service may be provided by a third party service or may include a web application. The application or service may store data associated with exchanged communications in a data store 619 directly or through a database server 618.

A computing device may communicate with the server over a network 610. The network 610 may comprise any topology of servers, clients, Internet service providers, and communication media. A system according to embodiments may have a static or dynamic topology. The network 610 may include multiple secure networks, such as an enterprise network, an unsecure network, or the Internet. The unsecure network may include a wireless open network. The network 610 may also coordinate communication over other networks, such as Public Switched Telephone Network (PSTN) or cellular networks. Furthermore, the network 610 may include multiple short-range wireless networks, such as Bluetooth, or similar ones. The network 610 may provide communication between the nodes described herein. By way of example, and not limitation, the network 610 may include wireless media. The wireless media may include, among others, acoustic media, RF media, infrared media, and other wireless media.

A textual scheme, a graphical scheme, an audio scheme, an animation scheme, a coloring scheme, a highlighting scheme, and/or a shading scheme may be employed to present prioritized and categorized communications and associated functionality.

Many other configurations of computing devices, applications, data sources, and data distribution systems may be employed for providing prioritized and categorized presentation of incoming communications. Furthermore, the networked environments discussed in FIG. 6 are for illustration purposes only. Embodiments are not limited to the example applications, modules, or processes.

Figure 7:
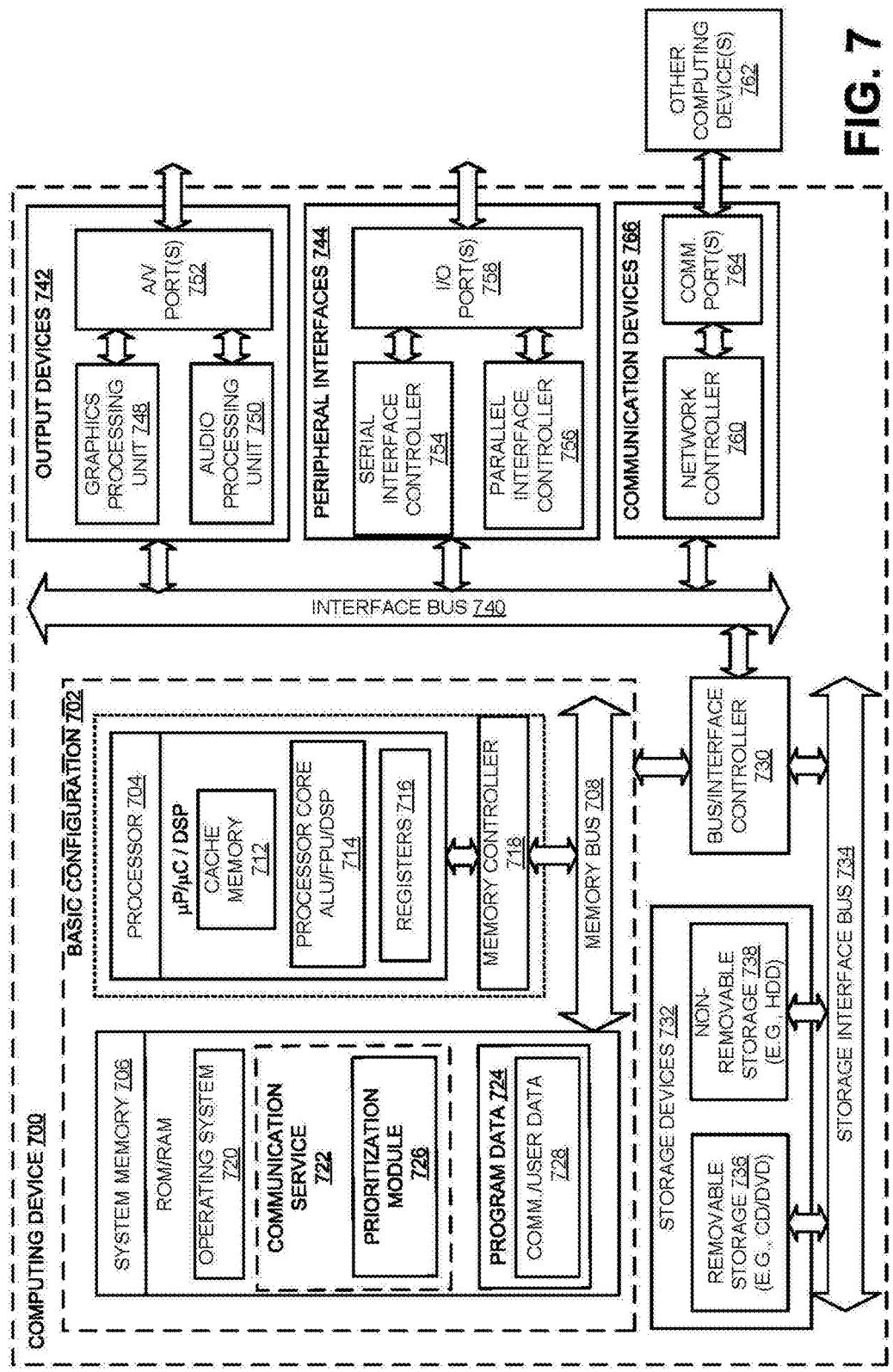
FIG. 7 is a block diagram of an example computing device, which may be used for providing prioritized and categorized presentation of incoming communications, according to embodiments.

FIG. 7 is a block diagram of an example computing device, which may be used for providing prioritized and categorized presentation of incoming communications, according to embodiments.

For example, a computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communication between the processor 704 and the system memory 706. The example basic configuration 702 may be illustrated in FIG. 5 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The one or more processor cores 714 may (each) include an arithmetic logic unit (ALU), a floating point unit (FPU), a digital signal processing core (DSP Core), or any combination thereof. An example memory controller 718 may also be used with the processor 704, or in some implementations, the example memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a communication service 722, and a program data 624. The communication service 722 may include a prioritization engine 726, which may provide prioritized and categorized presentation of incoming communications. Program data 724 may include, among others, user and/or communication data 728.

The computing device 700 may have additional features or functionality, and additional interfaces to facilitate communications between the example basic configuration 702 and any desired devices and interfaces. For example, a bus/interface controller 730 may be used to facilitate communications between the example basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the example basic configuration 702 via the bus/interface controller 730. Some of the one or more output devices 742 include a graphics processing unit 748 and an audio processing unit 750, which may be configured to communicate to various external devices such as a display or speakers via one or more A/V ports 752. The one or more peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 766 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example embodiments may also include methods for providing prioritization and categorization of incoming communications. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
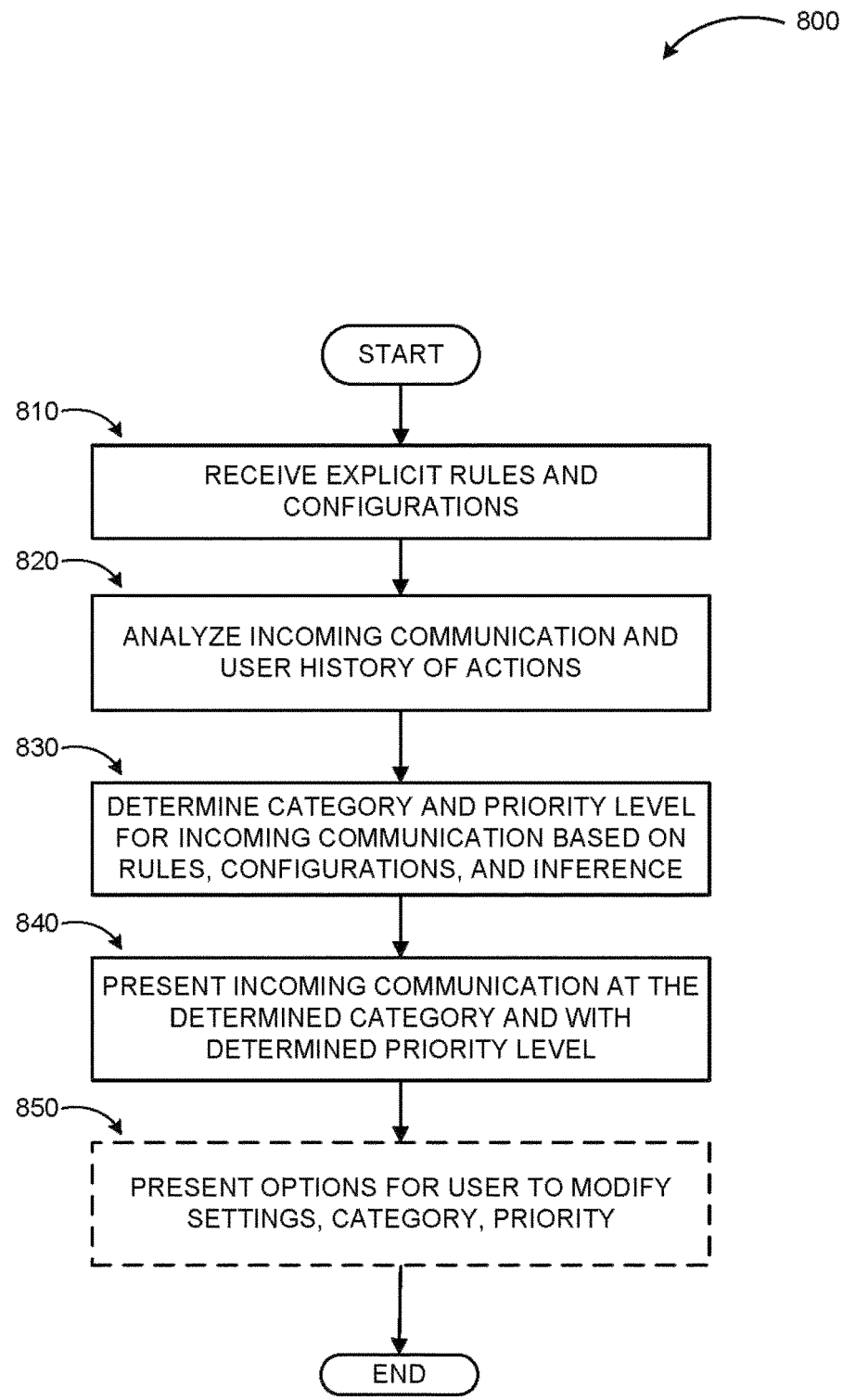
FIG. 8 is a logic flow diagram illustrating a process for providing prioritized and categorized presentation of incoming communications, according to embodiments.

FIG. 8 is a logic flow diagram illustrating a process for providing prioritized and categorized presentation of incoming communications, according to embodiments. A process 800 may be implemented by a communication service, a distributed communication application, a locally installed communication application, and/or their components, where the components may be executed on one or more servers or other computing devices.

The process 800 may begin with operation 810, where a prioritization engine of a communication service may receive explicit rules and configurations associated with processing incoming communications. At operation 820, the prioritization engine may analyze an incoming communication and a user history of actions associated with a sender of the communication, similar communications in the past, similar context, etc.

At operation 830, the prioritization engine may determine a category and a priority level for the incoming communication based on the received rules and configuration, and an inference based on the analysis of user history. The incoming communication may then be presented according to the determined category and priority level in an inbox of the user at operation 840. At an optional operation 850, options may be presented to the user to modify settings, category, and priority level associated with the incoming communication.

The operations included in process 800 are for illustration purposes. Providing prioritized and categorized presentation of incoming communications may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a computing device to provide prioritized and categorized presentation of incoming communications is described. The may include a memory and one or more processors coupled to the memory, the one or more processors executing a communication service in conjunction with instructions stored in the memory. The communication service may include a prioritization module that is configured to receive one or more explicit rules and configurations; analyze attributes of an incoming communication and a history of interactions of a recipient of the incoming communication; and determine a category and a priority level for the incoming communication based on the one or more rules and configurations and an inference based on the analysis. The communication service may also include a presentation module configured to provide the incoming communication to be displayed according to the determined category and priority level.

According to other examples, the presentation module may be configured to provide the incoming communication to be displayed through one of: an automatic categorization and ordering on an inbox user interface, a selection of a priority group control, and a selection from a list of available groups and categories. The prioritization module may also be configured to determine the category for the incoming communication based on content of the incoming communication, and/or determine the category and the priority level for the incoming communication by applying a model based on explicit rules and inferred rules. The prioritization module may be further configured to determine a likelihood of the recipient acting on the incoming communication and/or determine whether to notify the recipient or not about the incoming communication.

According to further examples, the presentation module may be configured to provide the incoming communication to be displayed employing one or more of a height, a background color, a font style, a font weight, a font color, an icon, a label, a card, and a stack to indicate a category and/or a prioritization of the incoming communication. The category may be social items, newsletters, promotions, purchases, travel items, finance items, events, contacts, family related items, photos, or documents. The presentation module may be further configured to provide to be displayed an item that includes distinct incoming communications of a same category or a prioritization group as a single roll-up of the distinct incoming communications, and/or provide to be displayed an item that includes incoming communications associated with a same aspect as a single roll-up of the incoming communications. The incoming communication may be an email, a text message, a calendar item, a contact card, an audio communication, or a video communication.

According to other examples, a method executed at one or more computing devices to provide prioritized and categorized presentation of items on an inbox of a communication application is described. The method may include receiving one or more explicit rules and configurations; analyzing attributes of an item and history of interactions of a recipient of the item; determining a category and a priority level for the item based on the one or more rules and configurations and an inference based on the analysis; and providing to be displayed the item according to the determined category and priority level through an automatic categorization and ordering of items on the inbox, a selection of a priority group control, or a selection from a list of available groups and categories.

According to some examples, the method may also include providing to be displayed one or more of context-specific summary information and context-specific functionality in conjunction with the item and enabling a third party associated with the item to customize the one or more of context-specific summary information and context-specific functionality in conjunction with the item. The context-specific functionality may include access to one or more resources associated with content of the item.

According to further examples, a computer-readable memory device with instructions stored thereon for providing prioritized and categorized presentation of items on an inbox of a communication application is described. The instructions may include receiving one or more explicit rules and configurations; analyzing attributes of an item and history of interactions of a recipient of the item; determining a category and a priority level for the item based on the one or more rules and configurations and an inference based on the analysis; and providing to be displayed the item according to the determined category and priority level through an automatic categorization and ordering of items on the inbox, a selection of a priority group control, or a selection from a list of available groups and categories, where the item is assigned to one of a "Focused" group and an "Other" group based on the determined priority level.

According to yet other examples, the instructions may further include providing to be displayed another item that represents a plurality of items in a same category rolled-up, and/or providing to be displayed one or more of the plurality of items under at least one other category item. The "Focused" group and the "Other" group may include a same category item that includes two distinct groups of items that belong to the same category, but have distinct assigned priority levels. The instructions may also include providing a smart notification to the recipient by selecting a suitable device based on the category and the priority level of the item.

According to some examples, a means for providing prioritized and categorized presentation of items on an inbox of a communication application is described. The means may include a means for receiving one or more explicit rules and configurations; a means for analyzing attributes of an item and history of interactions of a recipient of the item; a means for determining a category and a priority level for the item based on the one or more rules and configurations and an inference based on the analysis; and a means for providing to be displayed the item according to the determined category and priority level through an automatic categorization and ordering of items on the inbox, a selection of a priority group control, or a selection from a list of available groups and categories.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide prioritized and categorized presentation of incoming communications, the computing device comprising:
   a memory; and
   one or more processors coupled to the memory, the one or more processors executing a communication service in conjunction with instructions stored in the memory, wherein the one or more processors are configured to:
   receive one or more explicit rules and configurations;
   analyze an attribute and a content of an incoming communication and a history of interactions of a recipient of the incoming communication with past communications that included a similar attribute or a similar content as the incoming communication;
   determine a priority level of the incoming communication based on the one or more explicit rules and configurations and an inference based on the analysis;
   determine a category for the incoming communication based on the analyzed content, wherein the category is based on a type of the incoming communication unrelated to a priority status of the incoming communication; and
   when the priority level includes a low priority level, provide the incoming communication to be displayed within a low priority sub-folder of the inbox within a single roll-up item representing the category through an inbox user interface and provide the incoming communication to be displayed with a high priority sub-folder of the inbox within a single roll-up item representing the low priority sub-folder of the inbox.

2. The computing device of claim 1, wherein the one or more processors are further configured to provide the incoming communication to be displayed within the single roll-up item representing the category through the inbox user interface (UI) in response to detecting a selection from a list of available groups and categories.

3. The computing device of claim 1, wherein the one or more processors are further configured to determine the category and the priority status for the incoming communication by applying a model based on explicit rules and inferred rules.

4. The computing device of claim 1, wherein the one or more processors are further configured to determine whether to notify the recipient about the incoming communication.

5. The computing device of claim 1, wherein the one or more processors are further configured to provide the incoming communication to be displayed employing one or more of a height, a background color, a font style, a font weight, a font color, an icon, a label, a card, and a stack to indicate the category and/or a prioritization of the incoming communication.

6. The computing device of claim 1, wherein the category is one of social items, newsletters, promotions, purchases, travel items, finance items, events, contacts, family related items, photos, and documents.

7. The computing device of claim 1, wherein the incoming communication is one of an email, a text message, a calendar item, a contact card, an audio communication, and a video communication.

8. The computing device of claim 1, wherein the one or more processors are further configured to:
determine a likelihood that the recipient will interact with the incoming communication based on the one or more rules and configurations and an inference based on the analysis; and
move the incoming communication to a high or low priority sub-folder of an inbox based on the determined likelihood of interaction.

9. A method executed at one or more computing devices to provide prioritized and categorized presentation of items on an inbox of a communication application, the method comprising:
receiving one or more explicit rules and configurations;
analyzing an attribute and a content of an item and history of interactions of a recipient of the item with past items that included a similar attribute or a similar content as the item;
determining a priority level of the item based on the one or more explicit rules and configurations and an inference based on the analysis;
determining a category for the item based on the analyzed content, wherein the category is based on a type of the item unrelated to a priority status of the item; and
when the priority level includes a low priority level, providing the item to be displayed within a low priority sub-folder of the inbox within a single roll-up item representing the category through an inbox user interface and providing the item to be displayed with a high priority sub-folder of the inbox within a single roll-up item representing the low priority sub-folder of the inbox.

10. The method of claim 9, further comprising:
enabling a third party associated with the item to customize one or more of the context-specific information associated with the item and the additional functionality associated with the item and one or more other items within the single roll-up item.

11. The method of claim 9, wherein the additional functionality includes access to one or more resources associated with content of the item and one or more other items within the single roll-up item.

12. The method of claim 9, further comprising:
determining a likelihood that the recipient will interact with the item based on the one or more rules and configurations and an inference based on the analysis; and
moving the item to a high or low priority sub-folder of an inbox based on the determined likelihood of interaction.

13. A computer-readable memory device with instructions stored thereon for providing prioritized and categorized presentation of items on an inbox of a communication application, the instructions comprising:
receiving one or more explicit rules and configurations;
analyzing an attribute and a content of an item and history of interactions of a recipient of the item with past items that included a similar attribute or a similar content as the item;
determining a priority level of the item based on the one or more explicit rules and configurations and an inference based on the analysis;
determining a category for the item based on the analyzed content, wherein the category is based on a type of the item unrelated to a priority status of the item; and
when the priority level includes a low priority level, providing the item to be displayed within a low priority sub-folder of the inbox within a single roll-up item representing the category through an inbox user interface and providing the item to be displayed with a high priority sub-folder of the inbox within a single roll-up item representing the low priority sub-folder of the inbox.

14. The computer-readable memory device of claim 13, wherein the instructions further comprise:
determining another item has a same category as the category of the item; and
providing the other item to be displayed within the single roll-up item.

15. The computer-readable memory device of claim 14, wherein the instructions further comprise:
determining another category for one or more other items; and
providing to be displayed the one or more of the plurality of items within another single roll-up item representing the other category.

16. The computer-readable memory device of claim 15, wherein the instructions further comprise:
providing a smart notification to the recipient by selecting a suitable device based on the category and the priority status of the item.

17. The computer-readable memory device of claim 15, wherein the instructions further comprise:
determining a likelihood that the recipient will interact with the item based on the one or more rules and configurations and an inference based on the analysis; and
moving the item to a high or low priority sub-folder of an inbox based on the determined likelihood of interaction.

* * * * *